UNITED STATES PATENT OFFICE 2,516,130

NAPHTHALENE COMPOUNDS

Loren M. Long, Grosse Pointe Woods, and Harvey D. Troutman, Ferndale, Mich., assignors to Parke, Davis & Company, Detroit, Mich., a corporation of Michigan No Drawing. Application March 26, 1949, Serial No. 83,770

6 Claims. (Cl. 260—562)

This application relates to new chemical compounds and to chemical methods useful for their synthesis. More particularly, the invention relates to certain chemical compounds possessing antibiotic activity, intermediates useful in their preparation and derivatives thereof.

The end products of the present invention and their derivatives are 1-naphthyl-2-aminopropane-1,3-diol compounds having the general formula,

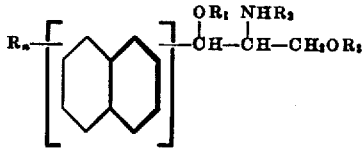

while the intermediates used in their preparation are naphthyl-α-acylamido-β-hydroxyethyl ketone compounds having the formula,

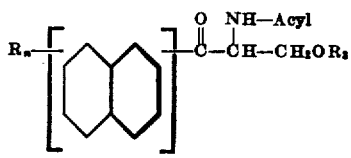

and naphthyl aminomethyl ketone compound having the formula,

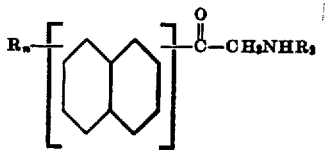

where $n$ is 1 or 2, R is the same or different when $n$ is 2 and represents hydrogen, halogen, nitro, lower alkyl or lower alkoxy radicals, $R_1$ and $R_3$ are the same or different and represent hydrogen or acyl radicals and $R_2$ represents hydrogen, H·HAcid or an acyl radical, HAcid being one equivalent of an inorganic or organic acid. The term "acyl" as used herein includes saturated and unsaturated lower aliphatic acyl, halogen substituted lower aliphatic acyl, carboxy substituted lower aliphatic acyl, cyano substituted lower aliphatic acyl, ether substituted lower aliphatic acyl, ester substituted lower aliphatic acyl, benzoyl, substituted benzoyl, araliphatic acyl, furoyl, pyridinoyl and the like radicals.

In its broader aspects the invention also includes the acid addition salts of the free bases of the 1-naphthyl-2-aminopropane - 1,3 - diol and naphthyl aminomethyl ketone compounds. Some examples of such acid addition salts are the hydrochloride, hydrobromide, hydroiodide, sulfate, sulfamate, phosphate, acetate, citrate, oxalate, succinate, benzoate, tartrate, phthalate, maleate, camphor sulfonic acid, bromcamphor sulfonic acid and the like.

It will be appreciated by those skilled in the art that the end products of the invention and their derivatives can exist in structural as well as optical isomeric forms. The term "structural" isomer or form as used herein refers to the cis or trans, that is, the planar relationship of the polar groups on the two asymmetric carbon atoms. To differentiate between these two possible diastereoisomers we will subsequently refer to the cis compounds as the "regular" [reg.] series or form and to the trans diastereoisomers as the "pseudo" [ψ] series or form. Such cis compounds are products wherein the two most highly polar of the groups on the asymmetric carbon atoms lie on the same side of the plane of the two carbon atoms. Conversely, the trans or pseudo compounds are those wherein the two most highly polar groups lie on opposite sides of the plane of the two carbon atoms.

Both the regular and pseudo forms exist as racemates of the optically active dextro [d] and levo [l] rotatory isomers as well as in the form of the individual or separated dextro [d] and levo [l] optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula the formula is to be interpreted in its generic sense, that is, as representing the [l]-ψ, [d]-ψ, [l]-reg. or [d]- reg. isomers in separated form as well as [dl]-ψ or the [dl]-reg. optical racemates or the total unresolved mixture of the structural and optical isomers. Such a formula does not merely represent the unresolved mixture of the isomers.

Our process for obtaining the compounds of the invention may be diagramamtically illustrated as follows:

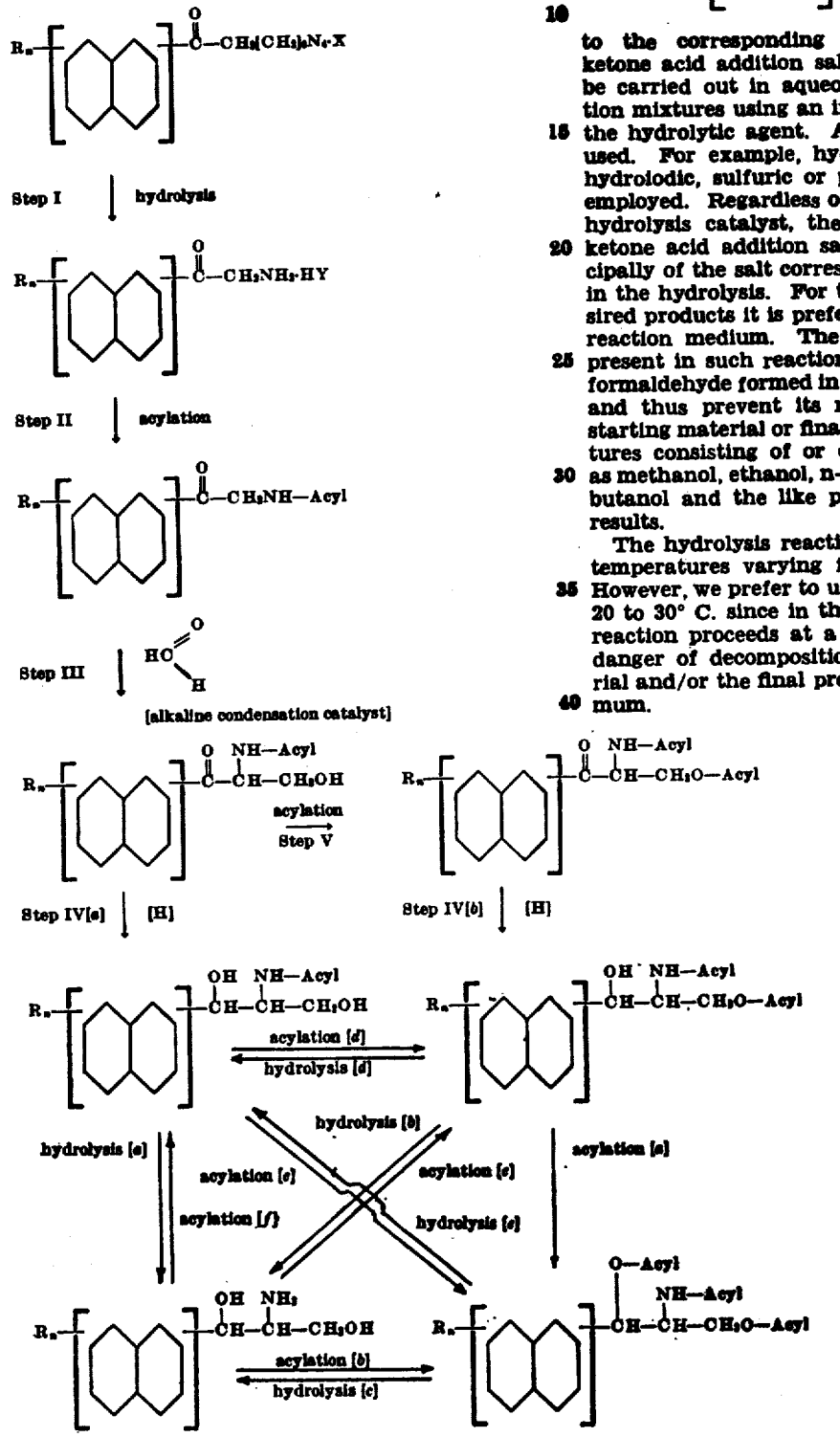

where X is a halogen atom, HY represents one equivalent of an inorganic mineral acid and R and $n$ have the same significance as given above.

Step I of our process comprises hydrolyzing a naphthyl halomethyl ketone-hexamethylenetetramine complex of formula

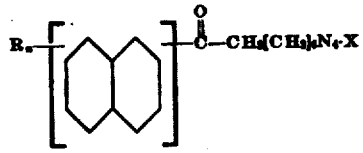

to the corresponding naphthyl aminomethyl ketone acid addition salt. This hydrolysis may be carried out in aqueous or nonaqueous reaction mixtures using an inorganic mineral acid as the hydrolytic agent. Any mineral acid can be used. For example, hydrochloric, hydrobromic, hydroiodic, sulfuric or phosphoric acids can be employed. Regardless of the acid selected as the hydrolysis catalyst, the naphthyl aminomethyl ketone acid addition salt formed consists principally of the salt corresponding to the acid used in the hydrolysis. For the best yields of the desired products it is preferable to use an alcoholic reaction medium. The function of the alcohol present in such reaction media is to remove the formaldehyde formed in the reaction as the acetal and thus prevent its reaction with either the starting material or final product. Reaction mixtures consisting of or containing alcohols such as methanol, ethanol, n-propanol, isopropanol, n-butanol and the like produce particularly good results.

The hydrolysis reaction can be carried out at temperatures varying from about 0 to 110° C. However, we prefer to use a temperature of about 20 to 30° C. since in this temperature range the reaction proceeds at a reasonable rate and the danger of decomposition of the starting material and/or the final product is almost at a minimum.

Step II of the process comprises converting the mineral acid addition salt of the naphthyl aminomethyl ketone obtained in Step I to the corresponding naphthyl acylamidomethyl ketone of formula

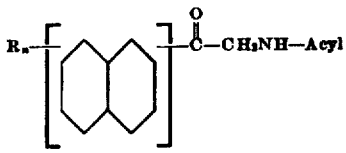

In carrying out this acylation an acid addition salt of the naphthyl aminomethyl ketone must be employed as the starting material since the free bases of these amino ketones are rather unstable. However, in order for the acylation reaction to take place the naphthyl aminomethyl ketone compound must be in the form of its free base or an organic acid addition salt and it is, therefore, necessary to generate simultaneously the free base or the organic acid addition salt in the reaction mixture and to acylate it. This is accomplished by carrying out the reaction in the presence of a weakly alkaline substance such as an alkali metal salt of an organic acid, an alkali or alkaline earth metal carbonate or bicarbonate, a tertiary organic base, a hydroxide of an amphoteric metal, calcium hydroxide and the like. Some specific examples of such weakly alkaline substances are sodium acetate, sodium bicarbonate, potassium bicarbonate, sodium carbonate, calcium carbonate, magnesium carbonate, pyridine, quinoline, triethylamine and aluminum hydroxide.

As acylating agents acyl halides or acyl anhydrides can be employed in conjunction with either aqueous or non-aqueous reaction mediums.

The temperature of the reaction is not particularly critical and can be varied over a considerable range without any significant deleterious effect upon the yields of the final products. In general, temperatures varying from 0° C. to at least 110° C. can be used although when a non-aqueous reaction mixture is employed the temperature can be increased if desired.

The next step in the process, Step III, comprises condensing the naphthyl acylamidomethyl ketone produced in Step II with formaldehyde in the presence of an alkaline condensation catalyst to obtain a naphthyl α-acylamido-β-hydroxyethyl ketone of formula,

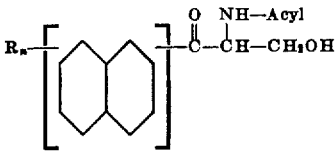

In carrying out this condensation the formaldehyde may be supplied to the reaction mixture in a number of different forms. For example, formaldehyde gas, aqueous or alcoholic solutions of formaldehyde, paraformaldehyde and other formaldehyde yielding polymers may be used. In most cases it has been found preferable to use an excess of formaldehyde usually up to about 4 or 5 mols in order to insure completeness of the condensation reaction.

A variety of solvents, alkaline condensation catalysts and reaction conditions may also be employed. As solvents, either aqueous or anhydrous lower aliphatic alcohols are particularly advantageous but moist dialkyl ethers and dioxane-water mixtures may also be used. The alkaline condensation catalyst used in this phase of the invention may be organic bases, inorganic bases or inorganic salts of acidic or pseudo acidic organic compounds. Some representative types of these catalysts are the hydroxides, oxides, carbonates, bicarbonates and amides of alkali or alkaline earth metals; alkali metal alkoxides; alkaline earth alkoxides; alkali metal phenolates; alkali metal salts of lower aliphatic carboxylic acids; organic tertiary amines and quaternary ammonium hydroxides of organic tertiary amines. In general, the weakly alkaline catalysts such as sodium bicarbonate, potassium bicarbonate, calcium hydroxide, pyridine, triethylamine, N-ethylmorpholine, N,N-dimethylaniline and the like are preferred since they make the reaction much easier to control. When strongly alkaline catalysts such as sodium hydroxide, potassium hydroxide, potassium carbonate, sodium methylate, sodium ethylate and the like are used, care must be taken to remove or inactivate the catalyst as soon as the reaction is completed in order to prevent the conversion of the desired product to the corresponding methylene bis compound by dehydration and coupling reaction. Although the amount of catalyst is not critical and can vary from a few hundredths or thousandths of a mol to one mol or more it is preferable from the standpoint of yields to use only enough to bring about a relatively rapid reaction. In most cases 0.05 mol or less is sufficient.

The temperature used in carrying out this methylolation reaction as well as the time required for its completion varies with the catalyst used. In general, the reaction can be carried out at a temperature between about 0 and 75° C. in a time varying from a few minutes to several hours. When strongly alkaline catalysts are used the reaction proceeds very rapidly and is usually complete in a few minutes at room temperature or below. However, when mildly alkaline catalysts are employed the reaction is not so rapid and usually requires from fifteen minutes to several hours at room temperature or slightly above, that is, at about 25 to 50° C.

The reduction of the naphthyl α-acylamido-β-hydroxy or β-acyloxyethyl ketone compounds to the corresponding 1-naphthyl-2-acylamido-3-hydroxy or 3-acyloxypropane-1-ol compounds shown by Step IV[a] and [b] in the above diagram can be carried out in several different ways. For example, it may be carried out using hydrogen gas in conjunction with a metal hydrogenation catalyst; an oxidizable aluminum alkoxide or nascent hydrogen generated in the reaction mixture by the interaction of a metal with an acid, lower aliphatic alcohol, water or mixtures of the same.

In carrying out the hydrogenation by catalytic means hydrogen pressures ranging from about 25 to 4000 lbs. per sq. in. and temperatures below about 100° C. can be used. However, in order to lessen hydrogenolysis of the product it is preferable to keep the temperature and pressure as low as possible. A temperature of about 25 to 45° C. and a pressure of about 40 to 1000 lbs. per sq. in. are usually sufficient to bring about reduction within a reasonable time and hence are preferred. Some examples of the hydrogenation catalysts which can be employed are Raney nickel, palladium, palladium oxide, platinum, platinum oxide and the like while suitable solvents for the reduction include lower aliphatic alcohols and aqueous solutions of the same, lower aliphatic acids, dioxane-water mixtures and the like.

When using the nascent hydrogen method of reduction metals or alloys such as sodium, potassium, calcium, sodium amalgam, potassium amalgam, iron and the like are caused to react with the solvent used for the reaction to produce hydrogen in the reaction mixture. Some examples of the solvents which can be used are lower aliphatic alcohols such as methanol, ethanol and isopropanol; lower aliphatic acids such as acetic acid; aqueous mixtures of either lower aliphatic alcohols or acids; moist dialkyl ethers such as moist diethyl ether and lower aliphatic alcohol-acid-water mixtures. Specific combinations of these metals and solvents which have been found to be particularly effective in bringing about the reduction of the ketonic compounds are sodium, potassium or calcium and absolute ethanol or methanol; sodium or potassium amalgam in moist ether, ethanol or acetic acid; and iron in dilute ethanol containing acetic acid.

When an oxidizable aluminum alkoxide is used as a reductant for the ketonic compounds of the invention the reaction is carried out at a temperature between about 20 and 125° C. in a lower aliphatic alcohol which is preferably the one corresponding to the alkoxide. The use of alkoxides of secondary alcohols such as isopropanol and secondary butyl alcohol is preferred since these alkoxides are more readily oxidized and hence milder reaction conditions can be employed. The amount of the oxidizable aluminum alkoxide in relationship to the quantity of the ketonic compounds to be reduced can be varied within rather large limits. In most cases it is seldom necessary to employ more than about three equivalents of the alkoxide but, if desired, as little as one equivalent to as much as twenty or thirty equivalents can be used. When using an alkoxide derived from a secondary aliphatic alcohol in a solvent of the alcohol corresponding to the alkoxide the preferred method of bringing about the reaction is to reflux the reaction mixture containing one or slightly more equivalents of the aluminum alkoxide and to distill off the oxidized alcohol [a lower aliphatic ketone] as it is formed in the reaction mixture.

Although all of the foregoing methods of reduction can be used with about equal success in most instances, there are of course instances where the use of one method is preferable. Similarly, the optimal conditions or reagents used in conjunction with one method vary somewhat in the individual cases. For example, where the ketonic compound to be reduced contains a halogen or nitro substituent in the phenyl ring it is preferable to use the oxidizable aluminum alkoxide method of reduction since the metallic catalysts used in the catalytic method of hydrogenation and some of the metals [such as sodium, potassium and the like] used in the nascent hydrogen method of reduction tend to remove the halogen atom during the reaction.

The conversion of the naphthyl α-acylamido-β-hydroxyethyl ketone compounds to the corresponding β-acyloxy derivatives shown by Step V in the above diagram can be effected by treating the β-hydroxy ketone compound with an acyl halide or acyl anhydride under substantially anhydrous conditions either alone or in the presence of an acylation catalyst such as an inorganic base, an alkaline salt of an organic acid, an organic tertiary base, an aromatic sulfonic acid or sulfuric acid. The acylation can, in general, be carried out at a temperature varying from about 10 to 140° C. but the preferred temperature for the reaction is between about 60 and 120° C. An inert organic solvent such as benzene, petroleum ether, toluene and the like can be used for the reaction if desired, although in most cases it is more expedient to omit the use of a solvent and to merely use an excess of the acylating agent. Some of the catalysts which can be used to bring about the reaction in a shorter period of time are sodium hydroxide, potassium hydroxide, potassium carbonate, sodium acetate, pyridine, quinoline, triethylamine, N-ethylmorpholine, N-methylpiperidine, N,N-dimethylaniline, p-toluenesulfonic acid and sulfuric acid.

The hydrolysis of the mono-, di- or tri-acylated 1-naphthyl-2-aminopropane-1,3-diol compounds to the corresponding 1-naphthyl-2-aminopropane-1,3-diols shown as hydrolysis [a], [b] and [c] in the above diagram can be effected with either alkaline or acidic hydrolysis catalysts or reagents. This hydrolysis reaction can be carried out using the unresolved, the racemic structural or the individual resolved optical and structural isomers of the acylated amino diols as starting materials. Dilute mineral acids such as hydrochloric, hydrobromic, hydroiodic, phosphoric and sulfuric acids are the preferred hydrolytic agents as they are more efficient in bringing about complete hydrolysis in a shorter time with less destruction of the final product. When acidic hydrolytic reagents such as the aforementioned mineral acids are employed the 1-naphthyl-2-aminopropane-1,3-diol product is present in the reaction mixture in the form of an acid addition salt and it can either be isolated as such or the salt can be neutralized and the amino diol isolated as the free base. Among the many alkaline reagents which can be used to bring about the hydrolysis are the alkali or alkaline earth metal hydroxides, oxides, carbonates, amides, alkoxides and phenolates; quaternary ammonium hydroxides and strong tertiary organic nitrogen bases.

The hydrolysis of the di- or triacylated 1-naphthyl-2-aminopropane-1,3-diol compounds to the corresponding 1-naphthyl-2-acylamidopropane-1,3-diols as shown in the above diagram as hydrolysis [d] and [e] involves selectively hydrolyzing the O-acyl groups present in the polyacylated amino diol compound. This is accomplished by treating the polyacylated amino diol starting compound with a strongly alkaline material dissolved in an aqueous solution containing a water-miscible organic solvent at about −20 to +50° C. Some of the strongly alkaline materials which can be used are the alkaline metal hydroxides, the alkaline earth metal hydroxides and the alkali metal carbonates. This transformation can also be effected in a similar manner using a mildly alkaline material such as an alkali metal bicarbonate and heating the mixture at about 75 to 100° C. Suitable organic solvents for use in this reaction are, in general, lower aliphatic alcohols such as methanol, ethanol, isopropanol, isobutanol, lower aliphatic ketones such as acetone, methylethyl ketone and cyclic ethers such as dioxane. The preferred method of carrying out this selective hydrolysis is to maintain the temperature in the neighborhood of 25° C. and to use only a slight excess over the amount of strongly alkaline material necessary to bring about the hydrolysis of the O-acyl group or groups. When carrying out the reaction in this fashion, the solvent of choice is about a 50% aqueous solution of a lower aliphatic alcohol such as methanol or a lower aliphatic ketone such as acetone.

As will be seen from the above diagram [see acylations [a], [b] and [c]], the completely acylated amino diols of the invention can be prepared by acylation of the free amino diol, its N-acylamino or its N-3-O-diacyl derivatives. The individual isomers or the optical racemates of the structural forms of the aforementioned starting materials as well as the unresolved form of the starting materials can be employed in the practice of this phase of the invention. Generically speaking, the process for preparing these completely acylated amino diols involves acylating a compound of the formula,

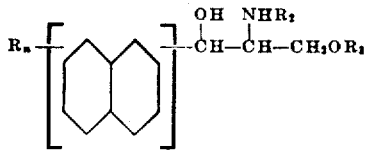

where R, R₂, R₃ and $n$ have the same significance as given above.

As acylating agents either acyl halides or acyl anhydrides can be used. These acylating agents which are preferably employed under substantially anhydrous conditions can be used alone or in conjunction with alkaline catalysts such as the alkali or alkaline earth metal hydroxides, carbonates and oxides, the organic tertiary bases and the like. Some specific examples of suitable alkaline catalysts are sodium hydroxide, potassium hydroxide, lithium hydroxide, barium hydroxide, potassium carbonate, calcium oxide, pyridine, dimethylaniline, N-ethylpiperidine, N-ethylmorpholine, quinoline, triethylamine and the like. In general, when no alkaline catalyst is employed the reactants must be heated together in order to bring about the reaction within a reasonable time. In most instances a heating period of several hours suffices. Where an alkaline catalyst is employed, heating is usually not necessary as the reaction proceeds with sufficient rapidity at moderate temperatures, that is, below about 50° C. In some instances, however, where the acyl halide or anhydride is not particularly reactive it is advantageous to carry out the reaction at a temperature above about 50° C.

This acylation process can also be carried out in an aqueous medium. This is most conveniently accomplished by using a two-phase reaction mixture, that is, one consisting of water and a water-immiscible organic solvent such as ethyl acetate, ether, chloroform and ethylene dichloride. In such a case it is preferable to carry out the reaction at about 25° C. or below and to employ a weakly alkaline material in conjunction with the acyl halide or anhydride. Some examples of the weakly alkaline materials which can be used are calcium carbonate, magnesium carbonate, barium carbonate and the like.

The 1-naphthyl-2-acylamido-3-acyloxypropane-1-ol compounds of the invention can be prepared as shown by the above diagram [see acylations [d] and [e]] by aclyating the corresponding free amino diol or its N-acylamido derivative. These starting materials which have the general formula,

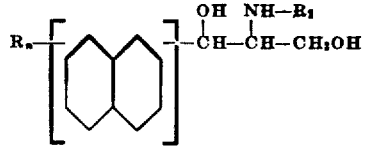

where R, R₂ and $n$ have the same significance as given above, may be used in their unresolved form or in the form of their individual separated isomers or as an optical racemate of one of the two structural forms. As acylating agents, acyl anhydrides or halides either alone or in conjunction with alkaline catalysts may be used.

In carrying out the acylation under substantially anhydrous conditions with an acyl anhydride, the reaction mixture is heated at about 60 to 135° C. for a short period of time. In most cases the reaction mixture need only be heated for about five to thirty minutes. If desired, the reaction can even be carried out at lower temperatures by allowing the reaction to proceed for a proportionately longer period of time. In general, however, the reaction is preferably carried out at about 70 to 100° C. for about one-half hour.

When an acyl halide is used as the acylating agent under substantially anhydrous conditions, and in the absence of a catalyst, the reaction is carried out at a temperature below about 50° C. As a precaution against side reactions it is preferable to use only a slight excess of the acyl halide over that required for the reaction with the terminal hydroxyl group and, in the necessary instances, the amino group.

When an alkaline catalyst is used in conjunction with either an acyl halide or anhydride, the reaction can be carried out at lower temperatures and within a shorter time. In general, the quantity of acylating agent should not be much in excess of that required to react with the terminal hydroxyl group and, where a free diol is used as the starting material, with the amino group. The preferred temperature for the reaction is in the range of 20 to 35° C. although the mixture can be heated to as high as 100° C. if desired.

If an alkaline catalyst is employed, the acylation can be carried out using an acyl halide in an aqueous medium at a temperature between about 0 and 35° C. As in some of the previously described modifications of the present acylation process, it is preferable to use only a slight excess of the acylating agent or the theoretically required amount. When the acyl groups are of a type which are readily hydrolyzed such as a lower aliphatic acyl group, the alkaline catalyst should be a relatively weak alkaline substance such as barium carbonate, calcium carbonate, magnesium carbonate, sodium acetate or the like. However, where the acyl groups are of a type more resistant to hydrolysis, such as benzoyl or substituted benzoyl radicals, strongly alkaline catalysts such as sodium hydroxide and the like may be employed.

Some specific examples of the alkaline materials which can be used in the above described acylation processes are sodium hydroxide, potassium hydroxide, lithium hydroxide, sodium carbonate, potassium carbonate, sodium bicarbonate, sodium acetate, calcium hydroxide, calcium carbonate, barium carbonate, magnesium carbonate, barium hydroxide, pyridine, triethylamine, quinoline, N-ethylmorpholine, N-methylpiperidine and the like.

The 1-naphthyl-2-acylamidopropane-1,3-diol compounds of the invention can be prepared as has been described above by reduction or hydrolytic processes. These products can also be produced by mono-acylation of the corresponding 1-naphthyl-2-aminopropane-1,3-diol as shown in the above diagram under acylation [f]. This latter method of preparation is of particular value where the product desired is an optically active isomer, since it is necessary to convert the optically racemic acylated products of the invention to the free amino diol in order to separate the optical racemate into its component isomers. It is also of value where the N-acylamido compound produced by the reduction or hydrolytic processes contains an acylamido group other than the one desired in the final product. In such a case, the N-acylamido compound is hydrolyzed to the free amino diol [hydrolysis [a] in the above diagram] and then the amino group of the free amino diol reacylated with the desired acyl group in accordance with the present monoacylation process.

In carrying out this mono-acylation process the free amino diol is treated with an acylating agent under mild acylating conditions. In order to eliminate the possibility of poly-acylation it is preferable to use either an ester-type acylating agent under substantially anhydrous conditions or an acyl anhydride or halide under substantially anhydrous conditions at a low temperature or an acyl anhydride or halide in a mildly alkaline aqueous reaction medium.

Where an acyl ester is used as the acylating agent the optimum reaction conditions are contingent upon the reactivity of the ester per se and also upon the reactivity of the potentially active substituents of the acyl portion of the molecule. Thus, for esters of a given acid the lower aliphatic alkyl esters are more reactive than higher alkyls and are, therefore, the preferred type, the methyl esters being the preferred member of the lower alkyl types. In the case of a highly active ester of the type of methyl dichloroacetate, the reaction is substantially complete in periods of one-half to four hours at temperatures varying from 100° C. to 50° C. On the other hand, a relatively inert ester such as methyl benzoate does not react with the amino diol starting materials in practical time intervals so that a catalyst such as an alkali metal alcoholate is added to accomplish this in a reasonable time. Again, while methyl dichloroacetate reacts when heated with the amino diols to form amides without substantial side reactions, the bromine atom of the corresponding methyl dibromoacetate at 100° C. reacts further to form cyclic amide ethers which are undesirable products. This side reaction is avoided by using a lower reaction temperature, that is, 40 to 60° C., in this instance or by use of an inert diluent such as alcohol.

When the acylation is carried out using an acyl anhydride or halide under substantially anhydrous conditions, the temperature should be kept below about 15° C. and preferably in the neighborhood of about 0° C. It is also preferable from the standpoint of increased yields and ease in controlling the temperature to carry out the reaction in an inert organic solvent. Some suitable solvents for this purpose are esters of lower fatty acids such as ethyl acetate, lower aliphatic ketones such as acetone and methyl ethyl ketone, cyclic ethers such as dioxane, hydrocarbons such as benzene and toluene, halogenated aliphatic hydrocarbons such as ethylene dichloride and chloroform.

The acylation in an aqueous reaction medium using an acyl halide or anhydride as the acylating agent is affected at a pH greater than 7 and at a temperature below the boiling point of the mixture. Water alone or water together with a water-miscible or water-immiscible organic solvent is used as the reaction medium. In general, water alone is satisfactory in most instances but where the amino diol starting material is quite insoluble it is sometimes advantageous to add a water-miscible organic solvent such as methanol, ethanol, or acetone to increase its water solubility and to facilitate the reaction. In other instances, however, where the acylating agent is quite reactive it is sometimes preferable to employ a two-phase system in order to minimize the exposure of the final product to the unreacted acylating agent. This is accomplished by carrying out the reaction in a mixture of water and a water-immiscible organic solvent such as ethyl acetate, ether, benzene, xylene, chloroform, carbon tetrachloride and the like. Some examples of the alkaline materials which can be used for maintaining the alkalinity of the reaction mixture are the alkali metal acetates, bicarbonates, carbonates, hydroxides and phosphates, the alkaline earth hydroxides and organic bases such as pyridine, N-ethyl morpholine, triethylamine and the like.

Although several different procedures for carrying out the N-mono-acylation of the amino diol starting compounds have been described above, there are, of course, instances where the use of one method or procedure is preferable. Similarly, the optimal conditions or reagents used in conjunction with one procedure vary somewhat in the individual cases. For example, when an acyl group containing at least one α-halogen atom is desired on the amino nitrogen atom in the final product the choice of the method of acylation is to some extent dependent upon the reactivity of the halogen atom or atoms. Thus, in the case of the mono-, di- and tri-fluoro and -chloro acetic acids, the halogens are relatively inert and the acyl amido diol compounds of the invention may be prepared by any of the methods described above with about equal success. However, where the halogen atoms are more reactive, as in the case of the α-bromo and α-iodo aliphatic acids, the preferred and best method of preparing the corresponding acylamido diol compounds is to react the amino diol with a haloacyl halide in a substantially anhydrous organic solvent such as ethyl acetate.

As pointed out above, the amino diols of the invention and their acylated derivatives can exist in structural as well as optical isomeric forms. Where a particular optical isomeric form or optical racemate of one of the two structural forms of these products is desired, it is necessary to separate the unresolved amino diol or acylated amino diol into its two component structural isomers. This is accomplished quite readily and completely by utilization of the differences in solubility of the two forms in water, organic solvents or in water-organic solvent mixtures. Some of the organic solvents which can be used in this fractional crystallization or solubilization are lower aliphatic alcohols, acetone, chloroform, ethyl acetate and the like. In some cases, the solvent solubility differential of the two forms is not great enough to afford a clean-cut separation of the two structural isomers and in these cases it is preferable to convert the isomer mixture of the free amino diol or acylated amino diol into another acylated derivative of the amino diol whose structural isomers differ more markedly in their solubility characteristics. The structural isomers of this new acylated amino diol can then be separated by fractional crystallization and the appropriate structural form of the product so obtained converted either by acylation or hydrolysis to the desired structural form of the free amino diol or acylated amino diol.

Where a particular optical isomer of the amino diol or acylated derivative thereof is desired the corresponding individual regular or pseudo structural form of the 1-naphthyl-2-aminopropane-1,3-diol is resolved into its optical isomers via an optically active acid addition salt. This resolution which must be carried out on the free amino diol is performed by forming an acid addition salt of the racemic amine with an optically active acid such as [d]-tartaric, [l]-tartaric, [d]-mandelic, [l]-mandelic, [d]-bromcamphor sulfonic, [l]-bromcamphor sulfonic, [d]-camphor sulfonic and [l]-camphor sulfonic, separating the two isomeric salts by recrystallization from a solvent such as a lower aliphatic alcohol or mixtures of the same with water or other organic solvents and then regenerating the individual optical isomers from the separated optically active acid addition salts by neutralizing each one separately. When carrying out this resolution it is desirable, but not absolutely necessary, to choose the form of the optically active acid so that the desired optical isomer will separate from the crystallization solution first.

The products of the invention are useful as intermediates in the preparation of other organic compounds. They are of particular value in the preparation of organic compounds possessing antibiotic activity against micro-organisms of the Rickettsia type. Some of the N-acyl amino diols of the invention are per se antibiotics and exhibit novel antibiotic activity against various Rickettsia and gram negative bacteria.

The invention is illustrated by the following examples.

*Example 1*

[a] 52 cc. of bromine is added slowly with stirring to 200 g. of 1-naphthyl methyl ketone in 1 liter of carbon tetrachloride at room temperature. As soon as the bromine color has been discharged from the solution the carbon tetrachloride is evaporated in vacuo to obtain the desired 1-naphthyl bromomethyl ketone of formula,

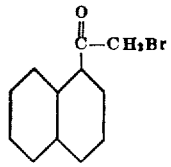

[b] 150 g. of hexamethylenetetramine dissolved in chloroform is added to the 1-naphthyl bromomethyl ketone prepared in [a] above and the mixture allowed to stand at room temperature for about three hours. The 1-naphthyl bromomethyl ketone - hexamethylenetetramine complex is collected, washed with a little chloroform and dried. The formula of this product is,

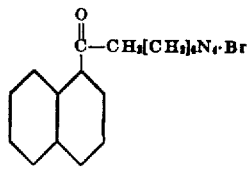

[c] 200 g. of 1-naphthyl bromomethyl ketone-hexamethylenetetramine complex is added to 225 cc. of concentrated hydrochloric acid in 1200 cc. of absolute ethanol and the mixture stirred overnight at room temperature. The insoluble hydrochloride salt of 1-naphthyl aminomethyl ketone is collected by filtration, washed with a small amount of cold water and dried at room temperature. The formula of this product is,

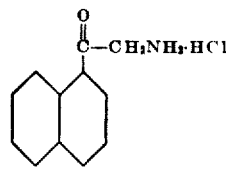

[d] 75 g. of 1-naphthyl aminomethyl ketone hydrochloride is dissolved in 500 cc. of glacial acetic acid and 300 cc. of acetic anhydride. 150 g. of sodium acetate is added in small portions with stirring and after the addition has been completed the solution is diluted with water. The 1-naphthyl acetamidomethyl ketone which separates is collected and recrystallized from methanol. The formula of this product is,

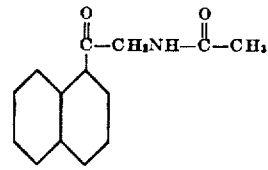

[e] 60 g. of 1-naphthyl acetamidomethyl ketone is mixed with 300 cc. of methanol and 75 cc. of 40% formalin. 2 g. of sodium bicarbonate is added and the mixture stirred at room temperature for about one hour during which time the desired product separates. The insoluble 1-naphthyl α-acetamido-β-hydroxyethyl ketone of formula,

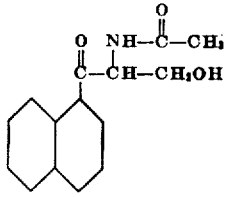

is collected and purified by recrystallization from ethyl acetate.

[f] A mixture consisting of 53 g. of 1-naphthyl α-acetamido-β-hydroxyethyl ketone, 75 g. of aluminum isopropylate and 1 liter of isopropanol is heated under reflux in an atmosphere of nitrogen for about five hours. During the refluxing period the acetone which has formed is distilled off from the mixture. The isopropanol is distilled from the reaction mixture under reduced pressure and the residue treated with about 1 liter of water. The mixture is heated to boiling to insure complete precipitation of the aluminum hydroxide, filtered while hot and the filtrate allowed to cool. The [dl]-ψ-1-[1-naphthyl]-2-acetamidopropane-1,3-diol which separates from the cooled solution is collected by filtration and purified by recrystallization from dilute ethanol. The formula of this product is,

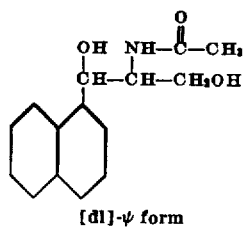

[dl]-ψ form

If desired, additional quantities of the [dl]-ψ-structural isomer and also the corresponding

[dl] - reg.-1-[1-naphthyl]-2-acetamidopropane-1,3-diol may be recovered from the aqueous filtrates by saturation of the filtrate with salt, exhaustive extraction with ethyl acetate, followed by distillation of the ethyl acetate from the extract. The residue which consists of a mixture of the two structural forms is separated by crystallization from water or dilute ethanol.

[g] 25 g. of [dl]-ψ-1-[1-naphthyl]-2-acetamidopropane-1,3-diol is heated with 600 cc. of 5% hydrochloric acid for twelve hours. The reaction mixture is cooled and the hydrochloride salt of [dl] - ψ - 1 - [1 - naphthyl]-2-aminopropane-1,3-diol which separates collected and washed with a small amount of water. The hydrochloride salt thus obtained is dissolved in water or suspended therein and the mixture treated with an excess of concentrated ammonium hydroxide. The [dl]-ψ-1-[1-naphthyl]-2-aminopropane-1,3-diol free base which separates is collected, washed with a small amount of water and purified by recrystallization from water. The formula of this product is,

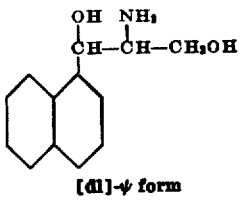

[dl]-ψ form

[h] 5 g. of [dl]-ψ-1-[1-naphthyl]-2-aminopropane-1,3-diol is dissolved in a minimum amount of water containing a small amount of methanol and the resulting solution treated with an aqueous solution containing an equivalent amount of [d]-tartaric acid. The solution is evaporated to dryness in vacuo and the residue fractionally crystallized from a minimum amount of hot methanol. The first isomer to separate from the solution in crystalline form is the [d]-tartaric acid salt of [l]-ψ-1-[1-naphthyl]-2-aminopropane-1,3-diol. The [d]-tartaric acid salt of [d]-ψ-1-[1-naphthyl]-2-aminopropane-1,3-diol is recovered from the filtrates after removal of the salt of the [l] isomer.

The [d]-tartaric acid salt of [l]-ψ-1-[1-naphthyl]-2-aminopropane-1,3-diol obtained above is dissolved in water, the solution made alkaline to pH 9 with sodium hydroxide solution and the precipitated [l]-ψ-1-[1-naphthyl]-2-aminopropane-1,3-diol free base collected. The formula of this product is,

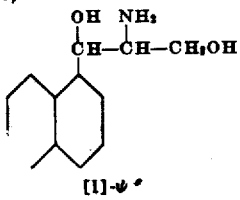

[l]-ψ

By decomposing the [d]-tartaric acid salt of [d] - ψ-1-[1-naphthyl]-2-aminopropane-1,3-diol in the same manner as described above for the [l] isomer one obtains the free base of [d]-ψ-1-[1-naphthyl]-2-aminopropane-1,3-diol. If desired, the [d]-tartaric acid used above may be replaced with [d]-camphor sulfonic acid. In this instance it is preferable to use a reaction mixture consisting of isopropanol or n-butanol rather than the methanol used in the fractional crystallization of the tartrate salts.

[i] 3 g. of [l]-ψ-1-[1-naphthyl]-2-aminopropane-1,3-diol is heated with about 10 cc. of methyl dichloroacetate on a steam bath for one-half hour. The reaction mixture is evaporated to dryness in vacuo and the residue recrystallized from water to obtain the desired [l]-ψ-1-[1-naphthyl] - 2-dichloroacetamidopropane-1,3-diol of formula,

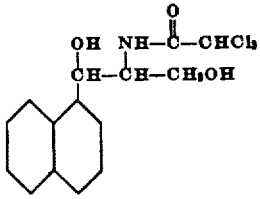

[j] 4 g. of [dl]-ψ-1-[1-naphthyl]-2-aminopropane-1,3-diol is heated with 10 cc. of methyl dichloroacetate on a steam bath for about one-half hour. The reaction mixture is evaporated to dryness in vacuo and the residue recrystallized from water to obtain the desired [dl]-ψ-1-[1-naphthyl] - 2-dichloroacetamidopropane-1,3-diol. This product has the formula,

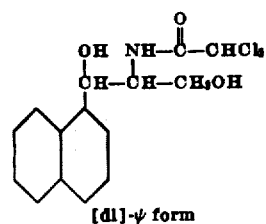

[dl]-ψ form

[k] A solution of 0.008 g. of sodium dissolved in methyl alcohol is added to a mixture consisting of 1 g. of [l]-ψ-1-[1-naphthyl]-2-aminopropane-1,3-diol and 7 g. of methyl benzoate in about 50 cc. of methanol. The reaction mixture is heated on a steam bath for about twenty minutes, the solution diluted with three volumes of 1 N hydrochloric acid and the oily precipitate which solidifies collected. The [l]-ψ-1-[1-naphthyl]-2-benzamidopropane-1,3-diol thus obtained may be purified by recrystallization from dilute alcohol or ethyl acetate-water mixture. Its formula is,

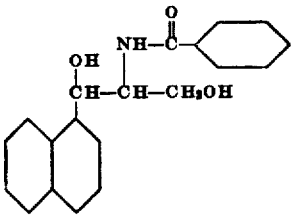

[l] 3 g. of [dl]-ψ-1-[1-naphthyl]-2-aminopropane-1,3-diol is added to a mixture composed of 6 cc. of acetic anhydride and 6 cc. of dry pyridine and the resulting mixture heated at 100° C. for about one-half hour. The reaction mixture is evaporated to dryness in vacuo and the residue recrystallized from methanol to obtain the desired triacetate of [dl]-ψ-1-[1-naphthyl]-2-aminopropane-1,3-diol of formula,

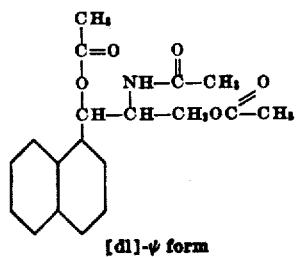

[dl]-ψ form

[m] 4 g. of [dl]-ψ-1-[1-naphthyl]-2-aminopropane-1,3-diol is heated with an excess of acetic anhydride at 70° C. for fifteen minutes. The reaction mixture is evaporated to dryness in vacuo and the residue recrystallized from ethanol. The white crystalline product thus obtained is [dl]-ψ-1-[1-naphthyl]-2-acetamido-3-acetoxypropane-1-ol of formula

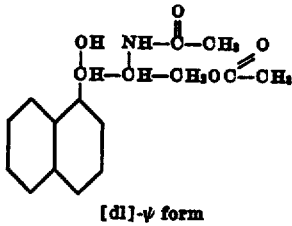

[dl]-ψ form

[n] 1.5 g. of [dl]-ψ-1-[1-naphthyl]-2-acetamido-3-acetoxypropane-1-ol is added to a mixture composed of 3 cc. of acetic anhydride and 3 cc. of dry pyridine and the resulting mixture heated at 100° C. for one-half hour. The reaction mixture is evaporated to dryness in vacuo and the residue recrystallized from methanol to obtain the desired triacetate of [dl]-ψ-1-[1-naphthyl]-2-aminopropane-1,3-diol. This product is identical in all respects with the product obtained by the procedure outlined in [l] above.

[o] 2.5 g. of [dl]-ψ-1-[1-naphthyl]-2-aminopropane-1,3-diol and 1.86 g. of p-nitrobenzoyl chloride in a two-phase system consisting of 120 cc. of 0.5 N potassium hydroxide and an equal volume of ether is shaken at 0° C. for ten minutes. The insoluble product is collected at the end of that time, washed with water and purified by recrystallization from alcohol. The product thus obtained is [dl]-ψ-1-[1-naphthyl]-2-[p'-nitrobenzamido]propane-1,3-diol of formula

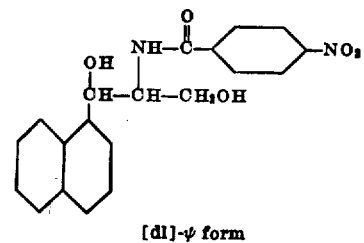

[dl]-ψ form

[p] 1.5 g. of [dl]-ψ-1-[1-naphthyl]-2-aminopropane-1,3-diol in 30 cc. of ethyl acetate is treated with 1.5 cc. of furoyl chloride at 0° C. After about one-half hour water is added to the mixture, the ethyl acetate layer separated and washed with dilute acid. The ethyl acetate layer is then washed with sodium bicarbonate solution and finally with water. The ethyl acetate is removed by distillation in vacuo and the residue recrystallized from water to obtain the desired [dl]-ψ-1-[1-naphthyl]-2-furamidopropane-1,3-diol of formula

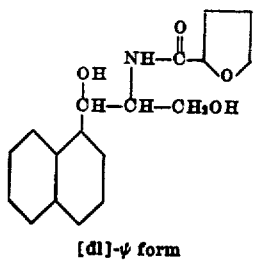

[dl]-ψ form

[q] A mixture consisting of 2.5 g. of [dl]-ψ-1-[1-naphthyl]-2-aminopropane-1,3-diol and 1.1 g. of succinic anhydride in a small amount of water is heated for thirty minutes. The reaction mixture is allowed to stand overnight at 25° C. and the crystalline [dl]-ψ-1-[1-naphthyl]-2-β-carboxypropionamidopropane-1,3-diol collected. This compound has the formula

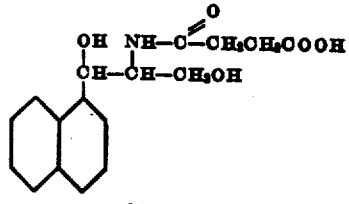

[dl]-ψ form

[r] A solution consisting of 0.1 g. of sodium methoxide in methanol is added to 5 g. of [dl]-ψ-1-[1-naphthyl]-2-aminopropane-1,3-diol and 6 g. of ethyl β,β-dimethyl acrylate in 125 cc. of dry methanol. The resulting mixture is heated for one-half hour, the alkali neutralized with 1 cc. of 1 N hydrochloric acid and the methanol evaporated in vacuo. The residue which consists of sodium chloride and the desired product is extracted with ethylene dichloride, the extracts filtered and the desired compound crystallized from the filtrates. Recrystallization from water yields the pure [dl]-ψ-1-[1-naphthyl]-2-β,β-dimethylacrylamidopropane-1,3-diol of formula

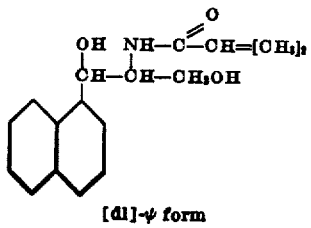

[dl]-ψ form

By starting with 2-naphthyl methyl ketone instead of 1-naphthyl methyl ketone in [a] above and carrying out the various processes described in the succeeding paragraphs, one obtains the following products:

2-naphthyl bromomethyl ketone.
2-naphthyl bromomethyl ketone - hexamethylenetetramine complex.
2-naphthyl aminomethyl ketone.
2-naphthyl acetamidomethyl ketone.
2-naphthyl α-acetamido-β-hydroxyethyl ketone.
[dl] - ψ - 1 - [2 - naphthyl] - 2 - acetamido - propane-1,3-diol.
[dl] - Reg. - 1 - [2 - naphthyl] - 2 - acetamido-propane-1,3-diol.
[dl] - ψ - 1 - [2 - naphthyl] - 2 - aminopropane - 1,3-diol.
[l] - ψ - 1 - [2 - naphthyl] - 2 - aminopropane - 1,3-diol.
[d] - ψ - 1 - [2 - naphthyl] - 2 - aminopropane - 1,3-diol.
[l] - ψ - 1 - [2 - naphthyl] - 2 - dichloroacet - amidopropane-1,3-diol.
[dl] - ψ - 1 - [2 - naphthyl] - 2 - dichloroacet - amidopropane-1,3-diol.
[l] - ψ - 1 - [2 - naphthyl] - 2 - benzamidopropane-1,3-diol.
The triacetate of [dl] - ψ - 1 - [2 - naphthyl] - 2 - amino-propane-1,3-diol.

[dl] - ψ - 1 - [2 - naphthyl] - 2 - acetamido - 3 - acetoxypropane-1-ol.

[dl] - ψ - 1 - [2 - naphthyl] - 2 - [p' - nitro - benzamido]propane-1,3-diol.

[dl] - ψ - 1 - [2 - naphthyl] - 2 - furamidopropane-1,3-diol.

[dl] - ψ - 1 - [2 naphthyl] - 2 - β,β - dimethyl - acrylamidopropane - 1,3 - diol.

[dl] - ψ - 1 - [2 - naphthyl] - 2 - β - carboxy - propionamidopropane-1,3-diol.

*Example 2*

[a] 120 g. of 4-methoxy-2-naphthyl bromomethyl ketone dissolved in a small amount of chloroform is added to a solution of 60 g. of hexamethylenetetramine in 750 cc. of chloroform. The solid product begins to separate almost immediately and the temperature of the reaction mixture rises slightly. After allowing the mixture to stand for about two hours, the 4-methoxy-2-naphthyl bromomethyl ketone-hexamethylenetetramine complex is collected, washed with a little chloroform and dried. The formula of this product is,

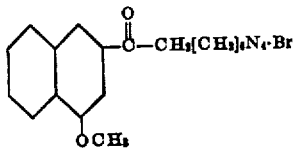

[b] 200 g. of the 4 - methoxy - 2 - naphthyl bromomethyl ketone - hexamethylenetetramine complex is mixed with a cold solution of 1 liter of absolute ethanol and 200 cc. of concentrated hydrochloric acid. The mixture is stirred overnight at room temperature and the solid product which consists of the hydrochloride salt of 4-methoxy-2-naphthyl aminomethyl ketone collected. The salt is washed with water to remove the ammonium chloride and dried. The formula of this product is,

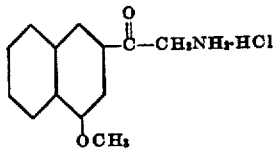

[c] 60 g. of 4-methoxy-2-naphthyl aminomethyl ketone hydrochloride is added in small portions to a mixture consisting of 80 g. of dry pyridine and 60 g. of phenyl acetyl chloride keeping the temperature below about 5° C. After stirring for about one hour 1200 cc. of cold water is added and the precipitated 4-methoxy-2-naphthyl phenylacetamidomethyl ketone of formula,

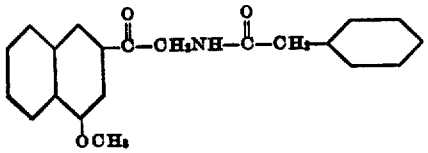

collected.

[d] 50 g. of 4-methoxy-2-naphthyl phenylacetamidomethyl ketone is mixed with 12 g. of paraformaldehyde in 1 liter of methanol. The resulting mixture is treated with 0.4 g. of sodium bicarbonate and heated at 40° C. for about twenty minutes with stirring. 3 liters of ice water are added and the crude 4-methoxy-2-naphthyl α-phenylacetamido-β-hydroxyethyl ketone which separates collected, washed with water and purified by recrystallization from alcohol. The formula of this product is,

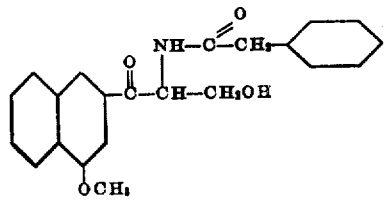

[e] A mixture consisting of 24 g. of 4-methoxy-2-naphthyl α - phenylacetamido - β - hydroxy - ethyl ketone, 20 g. of aluminum isopropylate and 400 cc. of dry isopropanol is heated under reflux while distilling off a small portion of the isopropanol from the reaction mixture. Refluxing is continued until the distillate gives a negative test for acetone and then the isopropanol distilled off in vacuo. The residue is cooled, treated with ice cold dilute hydrochloric acid and the insoluble unresolved 1-[4-methoxy-2-naphthyl]-2-phenylacetamidopropane - 1,3 - diol collected. Crystallization of this unresolved product from water or dilute ethanol yields the desired [dl]-ψ - 1 - [4 - methoxy - 2 - naphthyl] - 2 - phenyl - acetamidopropane-1,3-diol of formula,

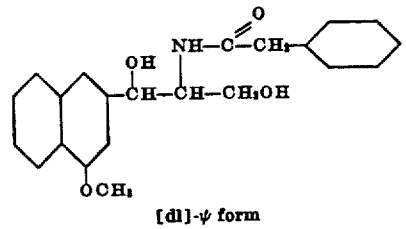

[dl]-ψ form

[f] 20 g. of [dl]-ψ-1-[4-methoxy-2-naphthyl]-2-phenylacetamidopropane-1,3-diol is heated for twelve hours under reflux with 650 cc. of 5% hydrobromic acid. The reaction mixture is cooled and the insoluble hydrobromide salt of [dl] - ψ - 1 - [4 - methoxy - 2 - naphthyl] - 2 - aminopropane-1,3-diol collected. The salt is dissolved in water, the solution made alkaline with sodium hydroxide to pH 10 and the free base of [dl] - ψ - 1 - [4 - methoxy - 2 - naphthyl] - 2 - aminopropane-1,3-diol which separates collected. This product has the formula,

[dl]-ψ form

[g] 1 g. of methoxyacetyl chloride is added to a solution of 2.7 g. of [dl]-ψ-1-[4-methoxy-2-naphthyl]-2-aminopropane-1,3-diol dissolved in ethyl acetate at 0° C. After thirty minutes the reaction mixture is washed with a small amount of water, then with saturated sodium bicarbonate solution and finally with water. The ethyl acetate layer is separated, dried and concentrated to a volume of a few cc. in vacuo. The concentrate is diluted with petroleum ether until the solution becomes cloudy and the solution allowed to stand in the cold until the crystalline [dl]-ψ-1-[4-methoxy-2-naphthyl]-2 - methoxyacetamidopropane-1,3-diol of formula,

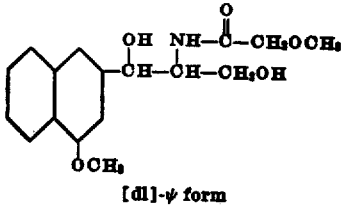

[dl]-ψ form separates. The product is collected, washed with a small amount of ethyl acetate and dried.

[h] A mixture consisting of 2 g. of ethyl cyanoacetate, 2.7 g. of [dl]-ψ-1-[4-methoxy-2-naphthyl]-2-aminopropane-1,3-diol, 0.05 g. of sodium methoxide and sufficient methanol to dissolve the solid reactants is heated under reflux for about one-half hour. 1 cc. of 1 N hydrochloric acid is added, the methanol evaporated off in vacuo and the residue diluted with 0.1 N hydrochloric acid. The insoluble [dl]-ψ-1-[4-methoxy - 2 - naphthyl]-2-cyanoacetamidopropane-1,3-diol is collected, washed with a small amount of water and dried. This product has the formula,

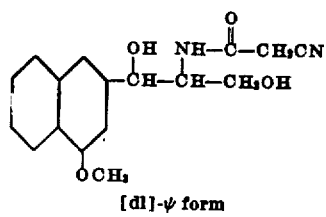

[dl]-ψ form

[i] 0.1 g. of sodium methoxide is added to a solution consisting of 5.4 g. of [dl]-ψ-1-[4-methoxy-2-naphthyl]-2-aminopropane-1,3-diol and 4 g. of ethyl lactate in 150 cc. of dry methanol. The mixture is refluxed for one-half hour, 1 cc. of 1 N hydrochloric acid added and the methanol removed by distillation in vacuo. The residue is taken up in hot ethyl acetate, the extract filtered to remove the sodium chloride and the filtrate chilled. The crystalline product thus obtained is [dl] - ψ - 1 - [4 - methoxy-2-naphthyl]-2-lacamidopropane-1,3-diol of formula,

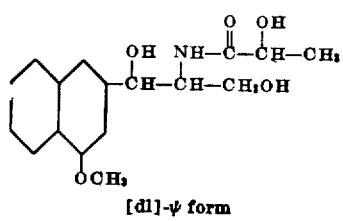

[dl]-ψ form

[j] 3 g. of [dl]-ψ-1-[4-methoxy-2-naphthyl]-2-aminopropane-1,3-diol dissolved in a small amount of warm butanol is added to a solution containing an equivalent amount of [d]-camphor sulfonic acid in n-butanol. The resulting mixture is cooled and the solid which separates collected and recrystallized twice from n-butanol. This product is the [d]-camphor sulfonate of [l]-ψ-1-[4-methoxy-2-naphthyl]-2 - aminopropane-1,3-diol. The salt is dissolved in a small amount of water containing an excess of sodium hydroxide and the insoluble free base of [l]-ψ-1-[4-methoxy-2-naphthyl] - 2 - aminopropane-1,3-diol of formula,

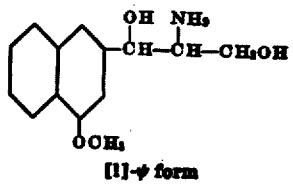

[l]-ψ form collected.

[k] A mixture consisting of 2 g. of [dl]-ψ-1-[4-methoxy-2-naphthyl]-2 - aminopropane-1,3 - diol and 4 g. of methyl benzoate in dry methanol is heated in the presence of a small amount of sodium methoxide at 60° C. for one-half hour. The alkali is exactly neutralized with dilute hydrochloric acid and the methanol removed by distillation in vacuo. The residue is taken up in hot ethyl acetate or alcohol and cooled to obtain the desired [dl]-ψ-1-[4-methoxy-2-naphthyl]-2-benzamidopropane-1,3-diol of formula,

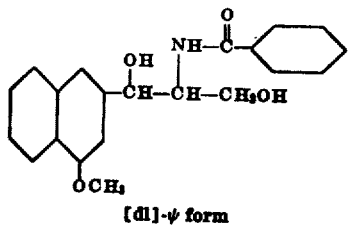

[dl]-ψ form

[l] 5 g. of [dl]-ψ-1-[4-methoxy-2-naphthyl]-2-aminopropane-1,3-diol and 6 g. of methyl dibromoacetate in 20 cc. of methanol is heated at 50° C. for about one hour. The reaction mixture is evaporated to dryness in vacuo, the residue washed with a small amount of carbon tetrachloride and recrystallized from water to obtain the desired [dl]-ψ-1-[4-methoxy-2-naphthyl]-2-dibromoacetamidopropane-1,3-diol of formula,

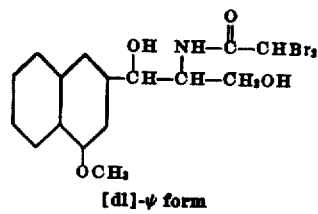

[dl]-ψ form

[m] A mixture consisting of 3.5 g. of 4-methoxy-2-naphthyl α-phenylacetamido-β - hydroxyethyl ketone and 10 cc. of acetic anhydride is warmed at 40° C. in the presence of 1 drop of concentrated sulfuric acid for one-half hour. The reaction mixture is evaporated to dryness in vacuo to obtain the desired 4-methoxy-2-naphthyl α-phenylacetamido-β-acetoxyethyl ketone of formula,

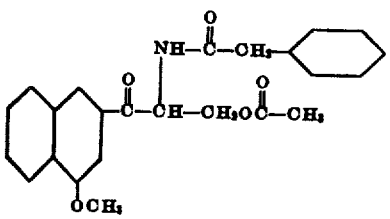

If one starts with 4-methoxy-1-naphthyl bromomethyl ketone instead of 4-methoxy-2-naphthyl bromomethyl ketone in [a] above and applies the processes set forth in the succeeding paragraphs above to the reaction product thus obtained, the following products are produced:

4-methoxy-1-naphthyl aminomethyl ketone hydrochloride.
4 - methoxy-1-naphthyl phenylacetamidomethyl ketone.
4-methoxy-1-naphthyl α-phenylacetamido-β-hydroxyethyl ketone.
[dl]-ψ-1-[4-methoxy-1-naphthyl]-2-phenylacetamidopropane-1,3-diol.
[dl]-ψ-1-[4-methoxy-1-naphthyl]-2 - aminopropane-1,3-diol.
[dl]-ψ-1-[4-methoxy-1-naphthyl] - 2-methoxy - acetamidopropane-1,3-diol.
[dl]-ψ-1 - [4-methoxy-1-naphthyl]-2-cyanoacetamidopropane-1,3-diol.
[dl]-ψ-1-[4-methoxy-1-naphthyl]-2 - lactamidopropane-1,3-diol.
[l]-ψ-1-[4-methoxy-1-naphthyl] - 2 - aminopropane-1,3-diol.
[dl]-ψ-1-[4-methoxy-1-naphthyl]-2-benzamidopropane-1,3-diol.
[dl]-ψ-1-[4-methoxy-1-naphthyl]-2-bromoacetamidopropane-1,3-diol.
4-methoxy-1-naphthyl - α - phenylacetamido-β-acetoxyethyl ketone.

Example 3

[a] 200 g. of 4-nitro-1-naphthyl bromomethyl ketone-hexamethylenetetramine complex is mixed with a cold solution of 1 liter of absolute ethanol and 200 cc. of concentrated hydrochloric acid. The mixture is stirred overnight at room temperature and the solid product which separates collected. The product is washed with ice water to remove the ammonium chloride and the residual 4-nitro-1-naphthyl aminomethyl ketone hydrochloride dried. The formula of this compound is,

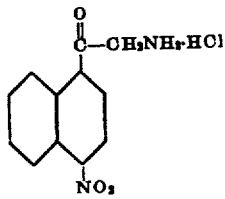

[b] The 4-nitro-1-naphthyl aminomethyl ketone hydrochloride prepared above is added to 500 cc. of glacial acetic acid and 300 cc. of acetic anhydride. 150 g. of sodium acetate is added slowly in small portions with stirring and the mixture stirred for about one-half hour. The reaction mixture is diluted with water and the precipitate which consists of the desired 4-nitro-1-naphthyl acetamidomethyl ketone is collected. Recrystallization from methanol or ethanol yields the desired product in pure form. The formula of this product is,

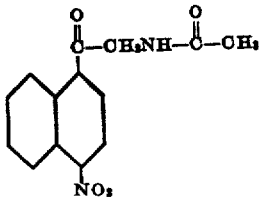

[c] A mixture consisting of 50 g. of 4-nitro-1-naphthyl acetamidomethyl ketone and 75 cc. of 40% formalin in 450 cc. of methanol is treated with 2 g. of sodium bicarbonate and the resulting mixture heated at 45° C. for about one-half hour. The reaction mixture is poured into 1½ liters of ice water and the crude 4-nitro-1-naphthyl α-acetamido-β-hydroxyethyl ketone which separates collected and washed with water. If desired, this product can be purified by recrystallization from methanol. Its formula is,

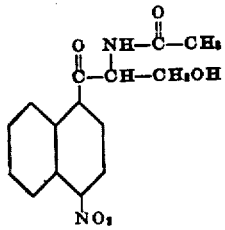

[d] A mixture consisting of 50 g. of 4-nitro-1-naphthyl α - acetamido - β - hydroxyethyl ketone and 75 g. of aluminum isopropylate in 1 liter of isopropanol is heated under reflux for five hours during which time the acetone which is formed is distilled off. At the end of the refluxing period the isopropanol is distilled from the reaction mixture under reduced pressure, the residue treated with a large volume of water and the mixture heated to boiling. The hot solution is filtered and the filtrate chilled to obtain the crystalline [dl] - ψ - 1 -[4-nitro-1-naphthyl]-2-acetamidopropane-1,3-diol of formula,

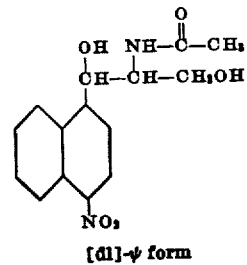

[dl]-ψ form

[e] 25 g. of [dl]-ψ-1-[4-nitro-1-naphthyl]-2-acetamidopropane-1,3-diol is added to 800 cc. of 5% hydrochloric acid and the resulting mixture heated under reflux for about twelve hours. The reaction mixture is cooled and the hydrochloride salt of [dl]-ψ-1-[4-nitro-1-naphthyl]-2-aminopropane-1,3-diol which separates collected and dissolved or suspended in water. The aqueous mixture is treated with an excess of concentrated ammonium hydroxide and the free base of [dl]-ψ-1-[4-nitro-1-naphthyl]-2-aminopropane-1,3-diol collected and purified by recrystallization from water. The formula of this product is,

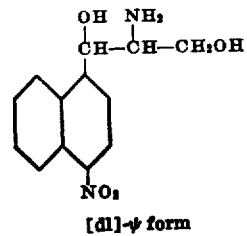

[dl]-ψ form

[f] A mixture consisting of 5 g. of [dl]-ψ-1-[4 - nitro - 1-naphthyl]-2-aminopropane-1,3-diol and 18 cc. of methyldichloroacetate is heated on a steam bath for about one-half hour. The reaction mixture is evaporated to dryness in vacuo and the residue recrystallized from water to obtain the desired [dl]-ψ-1-[4-nitro-1-naphthyl]-2-dichloroacetamidopropane-1,3-diol of formula,

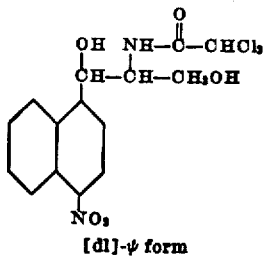

[dl]-ψ form

[g] 12 g. of [dl]-ψ-1-[4-nitro-1-naphthyl]-2-aminopropane-1,3-diol is dissolved in a small amount of hot methanol and added to a methanol solution containing an equivalent amount of [d]-tartaric acid. The mixture is cooled and the crystalline [d]-tartaric acid salt of [l]-ψ-1-[4 - nitro - 1-naphthyl]-2-aminopropane-1,3-diol collected, recrystallized twice from methanol and dried. Fractional crystallization of the reaction mixture filtrate yields additional quantities of this [d]-tartaric acid salt of [l]-ψ-1-[4-nitro-1-naphthyl]-2-aminopropane-1,3-diol. The salt thus obtained is dissolved in water and the solution treated with an excess of concentrated ammonium hydroxide. The [l]-ψ-1-[4-nitro-1-naphthyl]-2-aminopropane-1,3-diol free base which separates is collected, washed with water and purified further, if desired, by recrystallization from water. The formula of this product is,

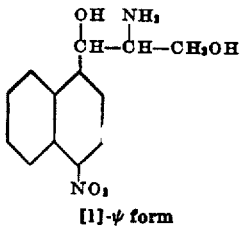

[l]-ψ form

Neutralization of the corresponding [d]-ψ salt yields the [d]-ψ-1-[4-nitro-1-naphthyl]-2-aminopropane-1,3-diol free base.

If desired, the corresponding [dl]-reg. racemic mixture can be substituted for the [dl]-ψ-1-[4-nitro-1-naphthyl]-2-aminopropane-1,3-diol used in the above procedure. In this case the first salt to separate from the solution is the [d]-tartaric acid salt of the [d]-reg.-1-[4-nitro-1-naphthyl]-2-aminopropane-1,3-diol.

[h] 5 g. of [l]-ψ-1-[4-nitro-1-naphthyl]-2-aminopropane-1,3-diol is added to 10 cc. of methyl dichloroacetate and the resulting mixture heated on a steam bath for about one-half hour. The reaction mixture is evaporated to dryness and the residue recrystallized from water to obtain the desired [l]-ψ-1-[4-nitro-1-naphthyl]-2-dichloroacetamidopropane-1,3-diol of formula,

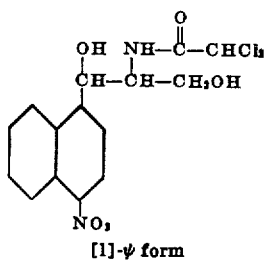

[l]-ψ form

[i] A mixture consisting of 1 g. of [dl]-ψ-1-[4-nitro-1-naphthyl]-2-aminopropane-1,3-diol, 10 cc. of dry pyridine and 10 cc. of benzoyl chloride is allowed to stand at room temperature for about twenty-four hours. The reaction mixture is poured into about 300 cc. of ice water and the precipitated product collected. The crude tribenzoate of [dl]-ψ-1-[4-nitro-1-naphthyl]-2-aminopropane-1,3-diol thus obtained is washed with sodium bicarbonate solution, water, dilute hydrochloric acid and finally again with water. This product which has the formula,

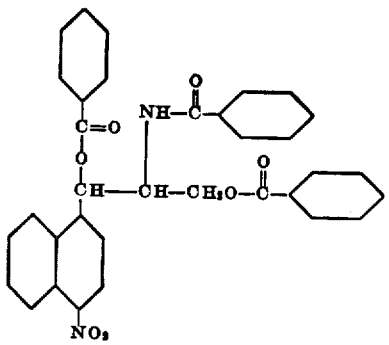

[dl]-ψ form may be purified further, if desired, by recrystallization from alcohol.

Instead of starting with 4-nitro-1-naphthyl bromomethyl ketone - hexamethylenetetramine complex used in [a] above, one can start with the hexamethylenetetramine complex of the following naphthyl halomethyl ketones:

8-nitro-1-naphthyl bromomethyl ketone.
1-nitro-2-naphthyl bromomethyl ketone.
2-nitro-1-naphthyl bromomethyl ketone.
8-nitro-2-naphthyl bromomethyl ketone.
5-nitro-2-naphthyl bromomethyl ketone.
5-nitro-1-naphthyl bromomethyl ketone.

Some of the products obtained by the above described processes when using such starting materials are:

1-nitro-2-naphthyl α-acetamido-β-hydroxyethyl ketone.
2-nitro-1-naphthyl α-acetamido-β-hydroxyethyl ketone.
5-nitro-2-naphthyl α-acetamido-β-hydroxyethyl ketone.
8-nitro-1-naphthyl α-acetamido-β-hydroxyethyl ketone.
[dl]-ψ-1-[1-nitro-2-naphthyl]-2-acetamidopropane-1,3-diol.
[dl]-ψ-1-[5-nitro-1-naphthyl]-2-acetamidopropane-1,3-diol.
[dl]-ψ-1-[8-nitro-2-naphthyl]-2-acetamidopropane-1,3-diol.
[dl]-ψ-1-[8-nitro-1-naphthyl]-2-aminopropane-1,3-diol.
[dl]-ψ-1-[2-nitro-1-naphthyl]-2-aminopropane-1,3-diol.
[dl]-ψ-1-[5-nitro-2-naphthyl]-2-aminopropane-1,3-diol.
[dl]-ψ-1-[1-nitro-2-naphthyl]-2-dichloroacetamidopropane-1,3-diol.
[dl]-ψ-1-[8-nitro-2-naphthyl]-2-dichloroacetamidopropane-1,3-diol.
[dl]-ψ-1-[5-nitro-1-naphthyl]-2-dichloroacetamidopropane-1,3-diol.

*Example 4*

[a] 130 g. of 4-iodo-1-napthyl bromomethyl ketone - hexamethylenetetramine complex is mixed with a cold solution of 1 liter of absolute methanol and 200 cc. of concentrated hydrochloric acid. The reaction mixture is stirred overnight at room temperature and the solid hydrochloride salt of 4-iodo-1-naphthyl aminomethyl ketone which separates collected. The salt is washed with cold water to remove the ammonium chloride and dried. The formula of this product is,

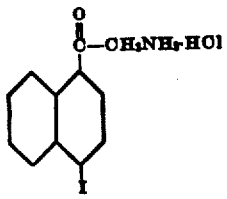

[b] A mixture consisting of 45 g. of 4-iodo-1-naphthyl aminomethyl ketone hydrochloride, 150 g. of benzoic anhydride and 18 g. of dry sodium acetate is heated at about 45° C. while small amounts of ice and water are added from time to time. Afater about one hour the mixture is diluted with 1 liter of water, cooled and adjusted to pH 8 with sodium hydroxide. The 4-iodo-1-naphthyl benzamidomethyl ketone which separates from the solution is collected, washed with water and dried. This product has the formula,

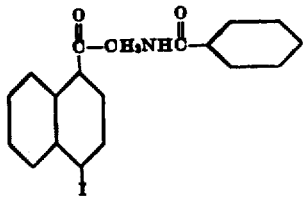

[c] 30 g. of 4-iodo-1-naphthyl benzamidomethyl ketone is mixed with 250 cc. of absolute methanol and 30 cc. of 40% Formalin. 0.6 g. of sodium bicarbonate is added and the mixture stirred at 35–40° C. for one and one-half hours. The mixture is cooled, stirred for a short time and the solid 4-iodo-1-napthyl α-benzamido-β-hydroxyethyl ketone collected, washed with water and dried. The formula of this product is,

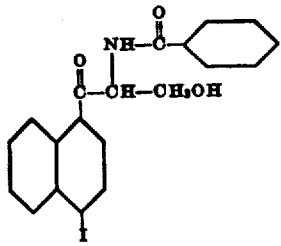

[d] A mixture consisting of 23 g. of 4-iodo-1-naphthyl α-benzamido-β-hydroxyethyl ketone and 35 g. of aluminum isopropylate in 1 liter of isopropanol is heated under reflux for about five hours. During the refluxing period the acetone which is formed is distilled off and a stream of nitrogen is passed through the solution. The isopropanol is distilled from the reaction mixture under reduced pressure and the residue containing the desired product treated with about 750 cc. of dilute hydrochloric acid. The insoluble product is collected, washed with a small amount of water containing hydrochloric acid to remove any remaining aluminum and dried. If desired, this unresolved 1-[4-iodo-1-naphthyl]-2-benzamidopropane-1,3-diol can be separated into its structural forms by recrystallization from aqueous alcohol or anhydrous alcohol. The first isomer to separate from the solution is the more insoluble [dl]-ψ-1-[4-iodo-1-naphthyl]-2-benzamidopropane-1,3-diol. The formula of this product is,

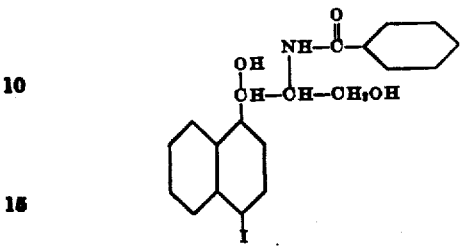

[dl]-ψ form

Instead of starting with the 4-iodo-1-naphthyl bromomethyl ketone - hexamethylenetetramine complex used in [a] above, one can start with the hexamethylenetetramine complex of the following halogen-substituted naphthyl halomethyl ketones:

8-iodo-1-naphthyl bromomethyl ketone.
5-bromo-1-naphthyl bromomethyl ketone.
2-bromo-1-naphthyl bromomethyl ketone.
6-chloro-1-naphthyl bromomethyl ketone.
3-chloro-2-naphthyl bromomethyl ketone.
6-bromo-2-naphthyl bromomethyl ketone.

Some of the products obtained by the above described processes when using these halomethyl ketones as starting materials are:

8-iodo-1-naphthyl α-benzamido-β-hydroxyethyl ketone.
2-bromo-1-naphthyl α-benzamido-β-hydroxyethyl ketone.
6-chloro-1-naphthyl α-benzamido-β-hydroxyethyl ketone.
3-chloro-2-naphthyl α-benzamido-β-hydroxyethyl ketone.
[dl]-ψ-1-[8-iodo-1-napthyl] - 2 - benzamidopropane-1,3-diol.
[dl]-ψ-1-[5-bromo-1-naphthyl] - 2 - benzamidopropane-1,3-diol.
[dl]-ψ-1-[2-bromo-1-naphthyl] - 2 - benzamidopropane-1,3-diol.
[dl]-ψ-1-[6-chloro-1-naphthyl] - 2 - benzamidopropane-1,3-diol.
[dl]-ψ-1-[3-chloro-2-naphthyl] - 2 - benzamidopropane-1,3-diol.
[dl]-ψ-1-[6-bromo-2-naphthyl] - 2 - benzamidopropane-1,3-diol.

*Example 5*

[a] 160 g. of 6-methyl-2-naphthyl bromomethyl ketone-hexamethylenetetramine complex is added to 1 liter of methanol and 200 cc. of concentrated hydrochloric acid. The resulting mixture is stirred overnight at room temperature and the insoluble 6-methyl-2-naphthyl aminomethyl ketone hydrochloride collected, washed with a small amount of water and dried in vacuo. The formula of this product is,

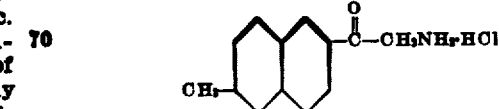

[b] A mixture consisting of 100 g. of 6-methyl-2-naphthyl aminomethyl ketone hydrochloride, 150 g. of p-toluyl anhydride and 18 g. of dry potassium carbonate is heated to about 40° C. and stirred as small quantities of water are added. After stirring for about two hours the mixture is diluted with 1 liter of ice water, cooled and the pH adjusted to about 8 with sodium hydroxide solution. The insoluble 6-methyl-2-naphthyl p-toluylamidomethyl ketone is collected, washed with water and dried in vacuo. The formula of this product is,

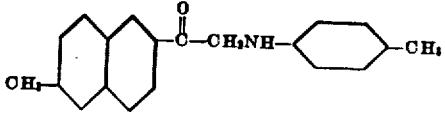

[c] A mixture consisting of 62 g. of 6-methyl-2-naphthyl p-toluylamidomethyl ketone, 300 cc. of methanol and 75 cc. of 40% Formalin is treated with 2 g. of potassium bicarbonate. The mixture is stirred at 35° C. for about one and one-half hours, cooled and the insoluble 6-methyl-2-naphthyl α-[p-toluylamido]-β-hydroxyethyl ketone collected. This product is washed with water and dried in vacuo. Its formula is,

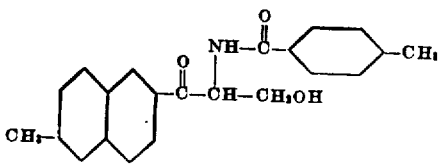

[d] 20 g. of 6-methyl-2-naphthyl α-[p-toluylamido]-β-hydroxyethyl ketone is heated at about 75° C. for one-half hour with 40 cc. of acetic anhydride containing a very small amount of concentrated sulfuric acid. The reaction mixture is evaporated to dryness in vacuo, the residue washed with ice water and purified by recrystallization from methanol or ethanol. The product thus obtained is 6-methyl-2-naphthyl α-[p-toluylamido]-β-acetoxyethyl ketone of formula,

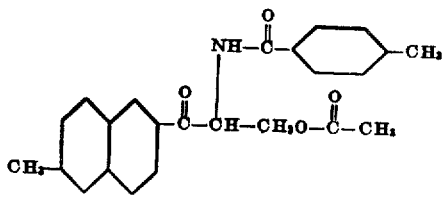

[e] 50 g. of 6-methyl-2-naphthyl α-[p-toluylamido]-β-hydroxyethyl ketone is dissolved in 1 liter of ethanol and 5 g. of Raney nickel hydrogenation catalyst added. The mixture is shaken with gaseous hydrogen under about 50 lbs. per sq. in. pressure for three to four hours at room temperature. The catalyst is removed by filtration, the filtrate heated to boiling and mixed with an equal volume of hot water. The [dl]-ψ-1-[6-methyl-2-naphthyl] - 2 - p - toluylamidopropane-1,3-diol which separates from the cool solution is collected and purified by recrystallization from dilute ethanol. The formula of this product is,

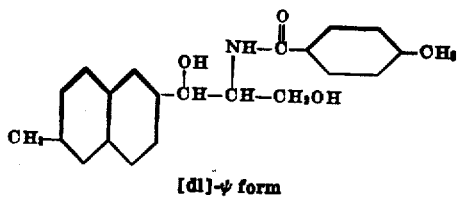

[dl]-ψ form

If desired, the corresponding [dl]-reg. isomer which is more soluble may be recovered from the aqueous ethanol filtrates.

If desired, the hexamethylenetetramine complexes of the following products can be substituted for the 6-methyl-2-naphthyl bromomethyl ketone-hexamethylenetetramine complex used as a starting material in [a] above:

3-methyl-2-naphthyl bromomethyl ketone.
2-methyl-1-naphthyl bromomethyl ketone.
4-methyl-1-naphthyl bromomethyl ketone.
7-methyl-1-naphthyl chloromethyl ketone.
4-methyl-2-naphthyl bromomethyl ketone.
2,4-dimethyl-1-naphthyl bromomethyl ketone.
2-chloro-4-methyl-1-naphthyl bromomethyl ketone.

Some of the products obtained by the above described processes when using such hexamethylenetetramine complexes as starting materials are:

2-methyl-1-naphthyl α-p-toluylamido-β-hydroxyethyl ketone.
7-methyl-1-naphthyl α-p-toluylamido-β-hydroxyethyl ketone.
2,4-dimethyl-1-naphthyl α-p-toluylamido-β-hydroxyethyl ketone.
2-chloro-4-methyl-1-naphthyl α-p-toluylamido-β-hydroxyethyl ketone.
2,4-dimethyl-1-naphthyl α-p-toluylamido-β-acetoxyethyl ketone.
[dl]-ψ-1-[3-methyl-2-naphthyl] - 2 - p - toluylamidopropane-1,3-diol.
[dl]-ψ-1-[2-methyl-1-naphthyl] - 2 - p - toluylamidopropane-1,3-diol.
[dl]-ψ-1-[4-methyl-1-naphthyl] - 2 - p - toluyl amidopropane-1,3-diol.
[dl]-ψ-1-[7-methyl-1-naphthyl] - 2 - p - toluylamidopropane-1,3-diol.
[dl]-ψ-1-[4-methyl-2-naphthyl] - 2 - p - toluylamidopropane-1,3-diol.
[dl]-ψ-1-[2,4-dimethyl-1-naphthyl]-2-p - toluylamidopropane-1,3-diol.
[dl]-ψ-1-[2-chloro-4-methyl-1-naphthyl]-2 - p- toluylamidopropane-1,3-diol.

The naphthyl halomethyl ketone-hexamethylenetetramine complexes used as starting materials in the practice of the invention may be prepared by reacting a naphthyl halomethyl ketone with hexamethylenetetramine in an inert organic solvent such as chloroform or carbon tetrachloride. Examples 1[a] and [b] and 2[a] above illustrate the preparation of some specific starting materials used in the practice of this invention.

Some of the subject matter disclosed but not claimed herein is described and claimed in our copending applications Serial Nos. 139,955; 139,956; 139,957; 139,958; 139,959 and 139,960, all filed January 21, 1950, as continuations-in-part of the instant application.

What we claim is:

1. A compound of the formula,

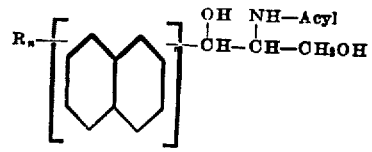

where $n$ is one of the integers 1 and 2 and is a member of the class consisting of hydrogen, halogen, $-NO_2$, lower alkyl and lower alkoxy radicals.

2. A 1-[1-naphthyl]-2-dihaloacetamidopropane-1,3-diol compound of formula,

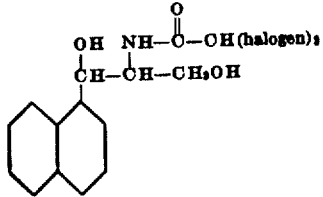

3. [dl]-ψ-1-[1-naphthyl]-2-dichloroacetamidopropane-1,3-diol.

4. A 1-[4-nitro-1-naphthyl]-2-dihaloacetamidopropane-1,3-diol compound of formula,

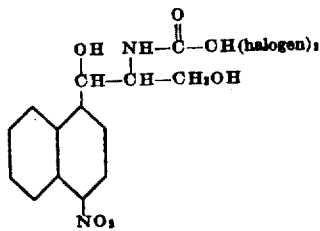

5. [dl]-ψ-1-[4-nitro-1-naphthyl]-2-dichloroacetamidopropane-1,3-diol.

6. [l]-ψ-1-[4-nitro-1-naphthyl]-2-dichloroacetamidopropane-1,3-diol.

LOREN M. LONG.
HARVEY D. TROUTMAN.

REFERENCES CITED

The following references are of record in the file of this patent:

Lister et al.: "Jour. Chem. Soc." (London), vol. 101 (1912), pp. 1297-1315.

Pictet et al.: "Chemical Abstracts," vol. 7 (1913), p. 1713 (Abstract of "Arch. Sci. Phys. Nat.," vol. 35, pp. 40–47).

Dey: "Chemical Abstracts," vol. 34 (1940), p. 5086 (abstract of "Arch. Pharm.," vol. 277, (1939), pp. 359–374 and 377–398).

Pajagopalan: "Chemical Abstracts," vol. 37 (1943), page 5050 (abstract of J. Ind. Chem. Soc., vol. 17 (1940) pp. 567–572).